April 23, 1968   K. STEISSLINGER   3,379,485
FLEXIBLE LENS HOOD WITH ANNULAR ATTACHING MEANS
Filed Nov. 29, 1963

KURT STEISSLINGER
INVENTOR.

BY

ATTORNEYS

United States Patent Office 3,379,485
Patented Apr. 23, 1968

3,379,485
FLEXIBLE LENS HOOD WITH ANNULAR
ATTACHING MEANS
Kurt Steisslinger, Stuttgart, Germany, assignor to Eastman Kodak Company, Rochester, N.Y.
Filed Nov. 29, 1963, Ser. No. 327,878
4 Claims. (Cl. 350—58)

The present invention relates to a lens hood, and more particularly to a lens hood which is easily attachable and detachable from a lens mount of a camera, yet sufficiently engages the lens mount so that the lens may be focused by moving the lens hood.

Prior art lens hoods are available which may be firmly fitted to the focusing ring of a lens mount so that distance setting of the lens system can be varied by the use of the lens hood. However, in such arrangements the fastening means of the lens hood to the lens mount are such that these parts may be placed together only in a certain position which requires careful handling and time-consuming preparation. Other known fastening means utilize various types of clamps and the like which can also be effected in certain positions or relationships, or in a method that requires special design of both the lens mount and the lens hood with subsequent increases in cost.

Therefore, an object of the present invention is to provide a simple and reliable lens hood arrangement overcoming these problems.

According to the present invention, the lens hood is made of a flexible material that can be easily attached or removed from a lens mount by deforming the rear annular surface of the lens hood so as to outwardly displace a pair of laterally disposed projections which upon release of the hood resiliently engage an annular groove on the outer surface of the lens mount.

Figure 1:
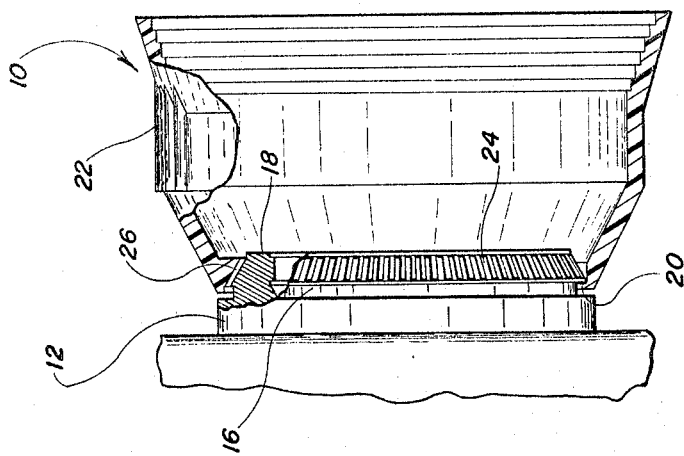
Figure 2:
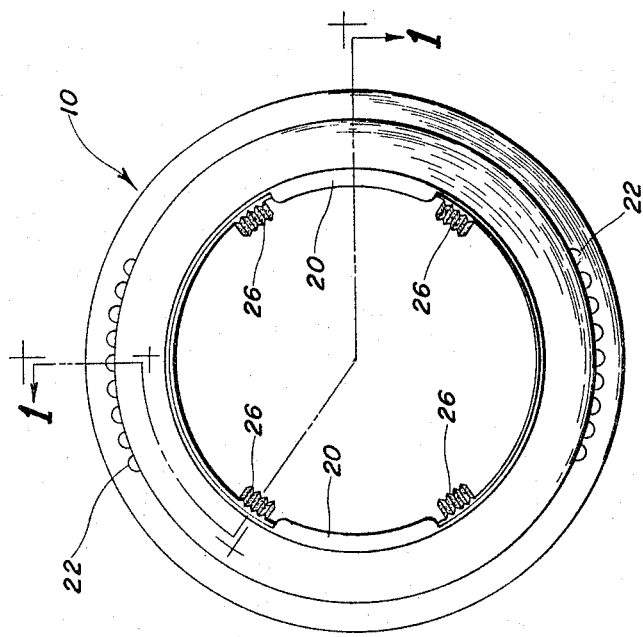

The subject matter which is regarded as my invention is particularly pointed out and distinctly claimed in the concluding portion of the specification. The invention, however, as to its organization and operation together with further objects and advantages thereof, will best be understood by reference to the following description taken in connection with the accompanying drawing in which:

FIG. 1 is a cross-section view of a lens mount supporting a lens hood according to my invention; and FIG. 2 is a rear elevation view of the lens hood of FIG. 1.

Referring now to the drawing, wherein like numbers refer to similar parts, in FIG. 1 I have shown a lens hood 10 provided with the usual nonreflecting inner surfaces and constructed of a resilient material such as certain relatively flexible plastics. As shown in FIG. 1, the lens hood 10 is supported on a lens mount 12. As is a usual construction, the forward, or leading, section of the lens hood is flared outward so that it does not greatly interfere with the field of view of the lens of the camera. In many cameras, the lens mount 12 is provided with a peripheral annular groove 16 near its forward surface 18.

FIG. 2 shows more clearly the rear section of the hood 10 which is provided with a pair of inwardly projecting members or flanges 20 which when the lens hood is relaxed will reside within the annular groove 16. Since the groove 16 extends entirely around the lens mount 12, the tangential location of the projections 20 is not restricted.

As seen from the rear, the central section of the lens hood 10 is also provided with a pair of beaded or knurled projection regions 22 coaxial with but displaced about 90 degrees respectively from each of the inward projections 20. Thus, the lens hood 10 may be easily slipped onto the lens mount 12 by compression of the knurled portions 22 to outwardly deflect the projections 20 and the lens hood 10 may be similarly removed from the lens mount 12 by compression of the knurled portions 22.

However, it is often desirable to be able to rotate a camera lens for focusing purposes by utilization of the lens hood 10 as a driving member. In the case under consideration, the lens mount 12 is provided with serrations or knurling around its outer surface as indicated at 24. The roughened surface 24 also extends around the lens mount periphery. Mating serrations or knurling is developed at portions 26 on the inner surface of the lens hood 10 so that there will be a rotary driving coupling therebetween whenever the lens hood is used.

While I have shown and described particular embodiments of the present invention, other modifications may occur to those skilled in this art. I intend, therefore, to have the appended claims cover all modifications which fall within the true spirit and scope of my invention.

I claim:
1. A lens hood adapted to be detachably mounted on a photographic camera having a lens mount provided with a peripheral annular groove, comprising:
    a hollow body formed of a flexible material, said body having an open ended generally cylindrical rear portion and an open ended front portion, said rear portion of said body being adapted to engage said lens mount when the lens hood is mounted thereon; and
    a pair of inwardly projecting flanges substantially diametrically located on the rear portion of said body and adapted to be received in the annular groove of the lens mount to support said body coaxially thereon in engagement with the lens mount, said body being attachable and detachable to the lens mount by resilient flexure of said body to displace the flanges outwardly.

2. A lens hood adapted to be detachably mounted on a photographic camera having a lens mount provided with a focus ring forming with the lens mount a peripheral annular groove and having an annular serrated surface, said lens hood comprising:
    a hollow body formed of a flexible material, said body having an open ended rear portion and an open ended front portion;
    a pair of inwardly projecting projections substantially diametrically located on the rear portion of said body and adapted to be received in the annular groove of the lens mount to support said body coaxially thereon; and
    coupling means on the rear portion of said body arranged to mate with the serrated surface of the focus ring to provide a driving coupling therebetween for operating the focus ring by rotating the lens hood.

3. A lens hood adapted to be detachably mounted on a focus ring of a camera lens mount, said focus ring forming with said lens mount a peripheral annular groove and having an annular serrated surface, said lens hood comprising:
    a hollow generally cylindrically shaped body formed of a flexible material, said body having an open ended rear portion, a central portion and an open ended front portion;
    a pair of diametrically located inwardly projecting projections on the rear portion of said body adapted to reside in the annular groove of the lens mount to support the said body coaxially thereon;
    a pair of diametrically opposed gripping means on the outer surface of the central portion of said body displaced about 90° from said projections whereby compression of said gripping means releases said projections to enhance attaching and detaching said body to the lens mount; and
    a plurality of coupling means on the rear portion of said body arranged to mate with the serrated surface of the focus ring to provide a driving coupling therebetween for operating the focus ring by moving the lens hood.

4. A lens hood adapted to be detachably mounted on a camera lens mount, provided with a focus ring having a rear annular surface and a peripheral annular serrated surface, said lens hood comprising: a hollow body formed of a flexible material, said body having a generally cylindrical open ended rear portion and an open ended front portion; a pair of inwardly projecting flanges substantially diametrically located on the rear portion of said body and adapted to engage the rear radial surface of said focus ring to support said body coaxially thereon, and coupling means on the rear portion of said body adapted to engage the serrations on said focus ring to provide a driving engagement between the focus ring and the body.

References Cited
UNITED STATES PATENTS

| | | | |
|---|---|---|---|
| 2,197,184 | 4/1940 | Kemp | 350—58 |
| 2,350,110 | 6/1941 | Hood | 350—60 |

JEWELL H. PEDERSEN, *Primary Examiner.*

CHARLES E. QUARTON, *Assistant Examiner.*